United States Patent

[11] 3,622,985

[72] Inventors John K. Ayling
Fishkill;
Hua-Tung Lee, Poughkeepsie, both of N.Y.

[21] Appl. No. 879,647
[22] Filed Nov. 25, 1969
[45] Patented Nov. 23, 1971
[73] Assignee International Business Machines Corporation
Armonk, N.Y.

[54] OPTIMUM ERROR-CORRECTING CODE DEVICE FOR PARALLEL-SERIAL TRANSMISSIONS IN SHORTENED CYCLIC CODES
7 Claims, 9 Drawing Figs.

[52] U.S. Cl. .......... 340/146.1
[51] Int. Cl. .......... G06f 11/12, G08c 25/00
[50] Field of Search .......... 340/146.1; 235/153

[56] References Cited

UNITED STATES PATENTS 3,452,328 6/1969 Hsiao et al. .......... 340/146.1
3,465,287 9/1969 Kennedy et al. .......... 340/146.1

OTHER REFERENCES

Hsiao, M. Y., Single-Channel Error Correction in an f-Channel System, IEEE Transactions on Computers, Vol. C-17, No. 10, October 1968, pp. 935–943.

*Primary Examiner*—Charles E. Atkinson
*Attorneys*—Hanifin & Jancin and Gunter A. Hauptman

ABSTRACT: Errors in transmitted shortened cyclic code words are detected and corrected by unusually simple apparatus at a receiver and transmitter connected together by a bus. A 72-bit parallel code word, actually comprising a 64-bit data portion and an eight bit checking portion, is conceptually expanded and treated as if it were 108 bits long. At both the transmitter and receiver, the word is split into four sequential groups and sent to an eight-position parallel feedback shift register via an 18-bit bus and intermediate circuits. Each bit on the bus is assigned a channel and the register positions are connected to selected channels through summing circuits, and to each other through feedback circuits, of varying complexity. At the transmitter, the final contents of the register are the checking portion of the code word. At the receiver, if there is an error, the final contents of the shift register indicate which bit in the data portion of the code word must be corrected. The eighteen bits on the bus are connected to selected ones of 27 conceptual channels of which 18 are real (connected to the bus) and nine are phantoms (not connected to anything). While no summing circuit connections are required for the phantom channels, each one of the 27 conceptual channels nevertheless has associated with it a known number of circuit connections. The amount of hardware is greatly reduced by connecting to the bus those conceptual channels requiring the least number of circuit connections and designating as phantoms those conceptual channels which would have required the most summing circuit connections. The total complexity of the feedback circuits and associated error location and correction circuits are similarly lessened.

INVENTORS
JOHN KENNETH AYLING
HUA-TUNG LEE
BY Gunter A. Hauptman
ATTORNEY

FEEDBACK SHIFT REGISTER

SUMMING CIRCUIT S1

OPTIMUM ERROR-CORRECTING CODE DEVICE FOR PARALLEL-SERIAL TRANSMISSIONS IN SHORTENED CYCLIC CODES

CROSS-REFERENCE TO RELATED APPLICATION

This application independently discloses an improvement over "Error Correcting Code Device for Parallel-Serial Transmissions," H. T. Lee, assigned to the International Business Machines Corporation, Ser. No. 862,206 filed Sept. 30, 1969 which is incorporated herein by this reference for explanatory purposes.

BACKGROUND OF THE INVENTION

1. Field of the Invention

The invention pertains to error detection and correction in data communication and processing systems, and particularly to an improved code generation, error detection and correction scheme wherein optimum design permits the circuitry to be greatly simplified for implementing shortened cyclic codes.

2. Description of the Prior Art

The invention described herein as an improvement of the invention described in the cross-referenced H. T. Lee patent application. While a review of the prior art improved upon by the referenced patent application will be found therein in detail, a brief review of the prior art necessary to understand this improvement will be given.

The invention relates to the use of shortened cyclic codes for error detection and correction. The values of check bits in a code word, which may indicate the existence of and location of an error in the code word, may be designated as a function of a cyclic code. One prior art technique generates check bits by serially feeding information bits into a serial feedback shift register. The generated check bits are transmitted together with the information bits, to a similar feedback shift register at the receiving end of the communications link. The entire code word is fed through the feedback shift register and the contents of the shift register then indicate whether there is an error and the location of the error. While there are limitations on the number of errors that may be detected and corrected depending on the code used, the discussion in this application is based on a "Single Error Correction/Double Error Detection" (SEC/DED) code. The underlying principles are explained in detail in an article by W. W. Peterson and D. P. Brown, entitled "Cyclic Codes for Error Detection" published in the Jan. 1961 Proceedings of the I.R.E., page 228.

While early techniques assumed serial information transfers from the data transmitter to the data receiver, it was recognized that it is faster to divide the data word into sections transmitted simultaneously over a number of parallel lines. The design of a parallel feedback shift register for detecting and correcting errors is shown in "Cyclic Codes and Multiple Channel Parallel Systems" by K. Y. Sih and M. Y. Shiao, published Dec. 1966 in the IEEE Transactions on Electronic Computers, Vol. EC 15, No. 6 page 927, and in U.S. Pat. No. 3,452,328, "Error Correction Device for Parallel Data Transmission System," M. Y. Hsiao et al., assigned to the International Business Machines Corp. Errors in parallel information may also be corrected, as shown in U.S. Pat. No. 3,465,287, "-Burst Error Detector," J. C. Kennedy et al., assigned to the International Business Machines Corp. In the foregoing, the number of parallel feedback shift register positions is no less than the number of channels. The cross-referenced Lee patent application obtains greater speed by providing more channels than register positions.

In Lee, a 72-bit code word comprises 64 information bits and eight check bits. It is divided, as an illustration, into four sequential sections of 18 bits each, the section having the check bits being transmitted last. Eighteen channels are provided, one for each bit in a section, and eight parallel feedback shift register positions, one for each check bit.

Given an $(n,k)$ cyclic code, where $n$ is the size of the code word and $k$, that of the information portion, (hence the number of check bits and the number of register positions are each $(n-k)$,) it is possible to generate a matrix of autonomous states representing the contents of serial feedback shift register stages at each shift, starting with the initial state (1000 . . . 0). (For an illustrative SEC/DED cyclic code with $n=72$ and $k=64$, the matrix shows that an $n-k$ position feedback shift register will repeat its contents after 127 shifts.) For a parallel channel system, connections between the channels and the shift register positions, and feedback connections within the shift register, are designated by this matrix. As will be briefly explained later, this matrix also defines connections for error location and correction. The illustrative matrix has 127 rows of successive autonomous state vectors, arranged in eight columns each representing an input to a shift register position. The matrix is translated into structural connections for the 18-channel system as follows: the first 18 rows of the matrix define connections between channels and register position inputs and the next eight rows define connections between register position outputs and inputs. Each register position input is connected to every channel and every register position output indicated by a one in the matrix through half-adder (EXCLUSIVE-OR) summing circuits. The total number of connections, and therefore the number of EXCLUSIVE-OR circuits, is fixed by the number of ones in the first 26 rows of the matrix.

SUMMARY OF THE INVENTION

The present invention achieves the advantages of the referenced application with substantially less connections and circuits. In the improvement, the actual code word size and channel capacity is unchanged, but the apparent number of channels is conceptually expanded to 27 and the apparent size of the code word is conceptually expanded to 108. The matrix of autonomous states for this expanded code ($n=108$, $k=100$, $c=27$) is still the previously described matrix, however, the number of conceptual channels provided and the choice of rows defining connections is a function of the matrix structure. In the illustrative case, the first 27 rows of the matrix will define the input connections between the conceptual channels and the feedback shift register position inputs and the next successive group of eight rows will define feedback connections among the shift register positions. The extra channels called "phantoms" are so chosen that the remaining connection submatrix will correspond only to those rows of the matrix requiring the least number of connections. For example, if rows 15 and 20–27 are designated as phantoms, rows 1–14 and 16–19 will define input connections between 18 actual channels and the feedback shift register and rows 28–36/ will define the feedback connections among shift register positions, saving two input connections and 12 feedback connections over the corresponding prior art system.

DESCRIPTION OF THE PREFERRED EMBODIMENTS

Figure 1:
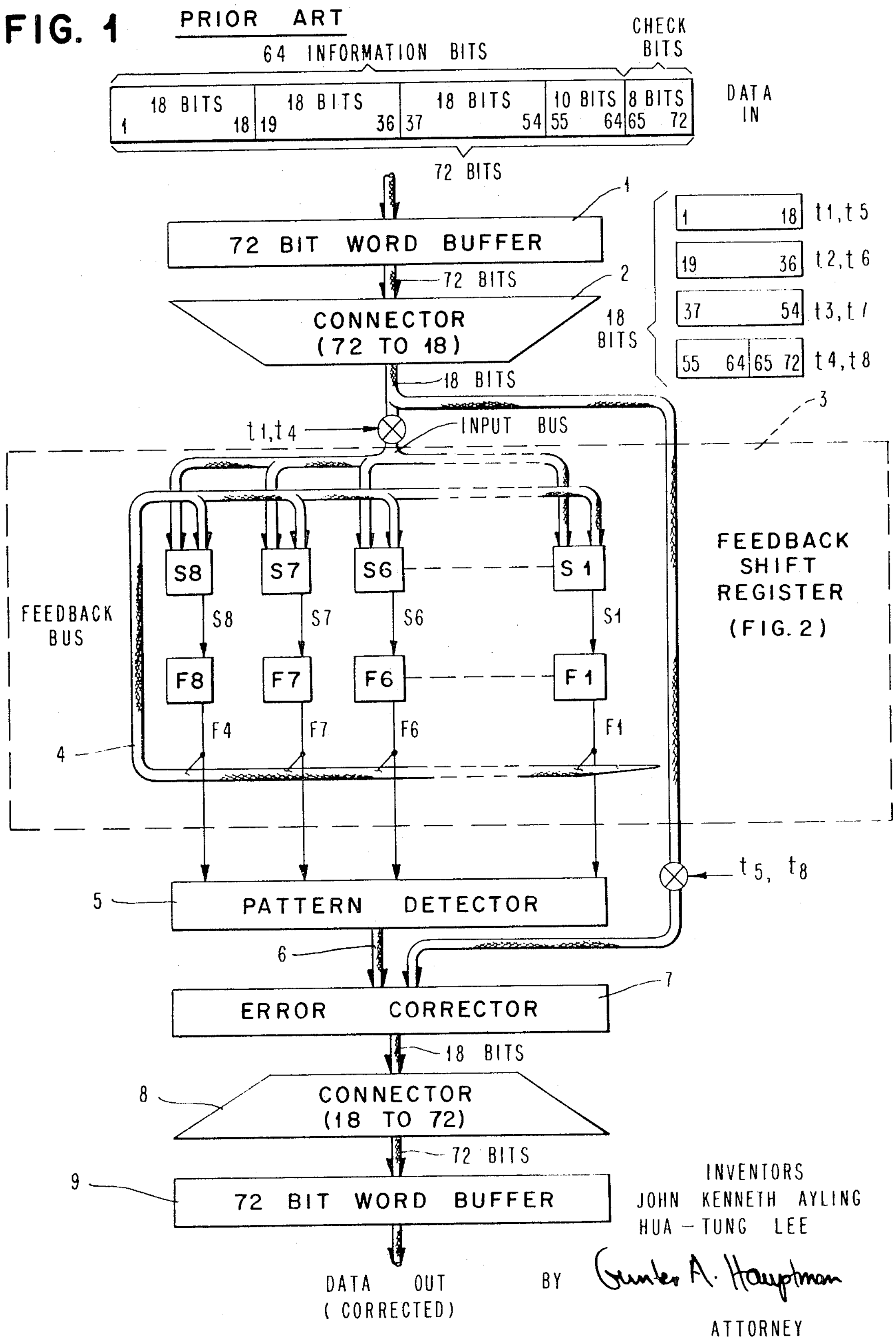
FIG. 1 is a block diagram showing a prior art error detection and correction system.

To fully appreciate this invention, it is desirable to understand the construction and the operation of the prior art device described in the previously cross-referenced Lee patent application. In describing both the prior art Lee device and the present invention it will be necessary to describe only the decoding of code words because of the encoding uses essentially identical circuits. Further, the principles involved may be easily extended to error location and correction circuits. Beginning with the prior art, FIg. 1 shows a 72-bit code word format comprising 64 information bits and eight check bits. Binary 1-bits and 0-bits are placed into a 72-bit word buffer 1 and held there during all subsequent operations. A connector 2 divides the 72-bit word into four sequential 18-bit sections which are gated onto an 18-bit input bus, at times $t_1$, $t_2$, $t_3$, $t_4$, and entered into a feedback shift register 3. The feedback shift register includes eight register positions F1 through F8 having inputs connected to the 18 bits of the input bus by eight summing circuits S1 through S8 and outputs connected to a feedback bus 4 and pattern detectors 5. The feedback bus 4 interconnects the outputs and inputs of feedback shift register positions F1 through F8 through summing circuits S1 through S8.

When the entire 72-bit code word has been entered into the feedback shift register 3, 18 bits at a time, the contents of positions F1 through F8 manifest a "syndrome" which provides an indication of the accuracy of the information bits of the code word. If there are no errors, the feedback shift register positions F1 through F8 will contain only zeros, if otherwise, an error is indicated. If there are an odd number of ones in the syndrome, a single error is assumed (an odd number of ones in the syndrome may also be caused by any odd multiple errors, but this is assumed not to have occurred) and SEC is attempted as will be explained. An even number of ones indicates two, or any even number of, errors which signals that there is no need for an SEC attempt. Single error correction is accomplished using a pattern detector 5 for sensing the contents of the register positions F1 through F8 and translating the eight bits therein into a 1-out-of-18 indication on an 18-bit bus 6 corresponding to an incorrect position in the 18 -bit section. Error correction may be accomplished at any one of the times $t_5$, $t_6$, $t_7$, or $t_8$ when the contents of buffer 1 are transferred to buffer 9 in 18-bit sections. At each of the times $t_5$, $t_6$, and $t_7$ the feedback shift register is autonomously shifted once to yield a new syndrome which is to be used for error location in the following section of 18 bits. The error corrector 7 inverts that bit of the section being transferred which is at the position indicated by the pattern detector 5 on the appropriate line of bus 6. The error corrector 7 sends the sections to a connector 8 which places each section into its position in 72-bitπ-word buffer 9 so that the corrected data-out word assumes the same format as the original data-in word.

Figure 2:
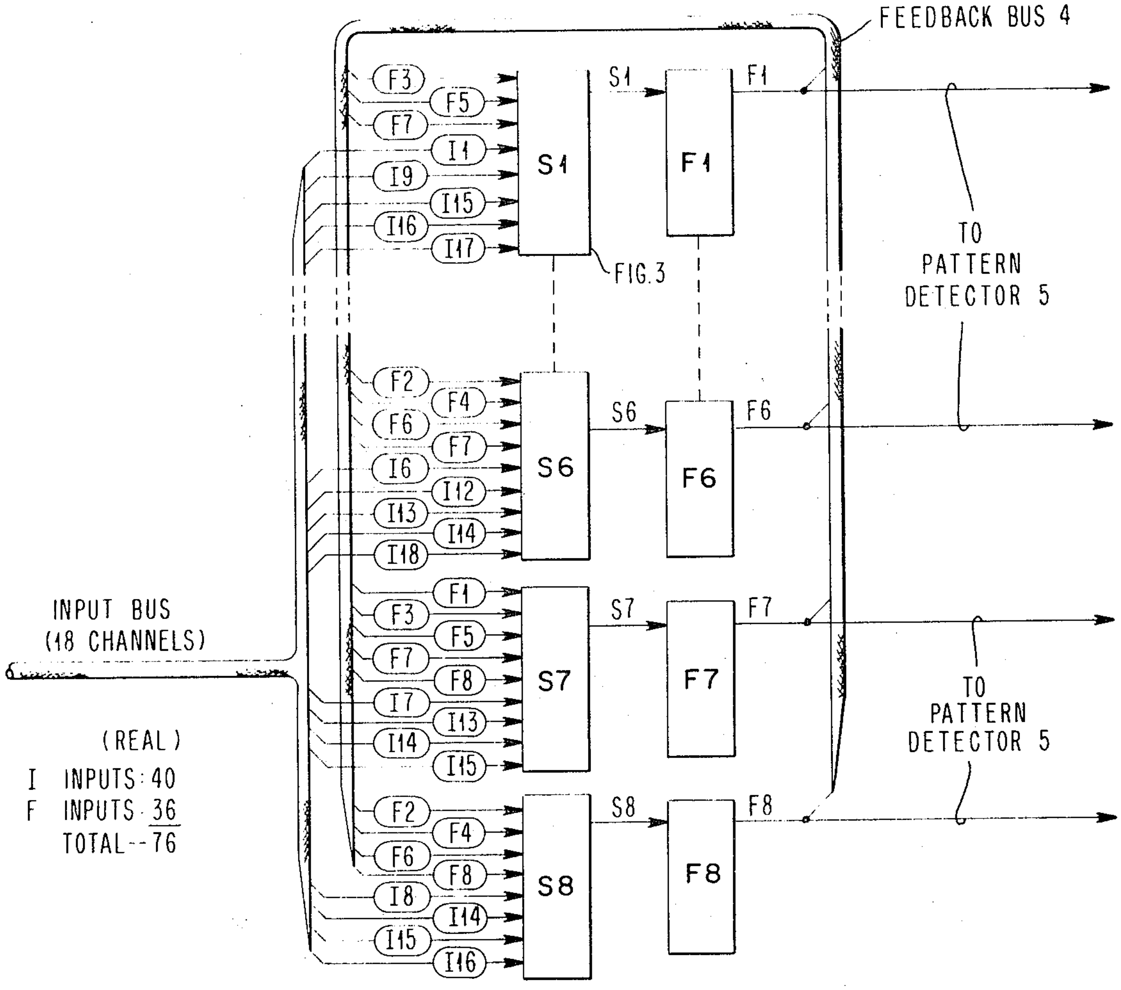
FIG. 2 PRIOR ART
FIG. 2 is a logic diagram showing the feedback shift register in the prior art system.

Referring now to FIG. 2 certain details of the prior art feedback shift register 3 useful for full appreciation of the invention will be explained. Positions F1 through F8 receive their inputs from corresponding summing circuits S1 through S8. Each summing circuit has one group of inputs from the input bus designated I1 through I18 and another group of inputs from the outputs of feedback shift register positions designated F1 through F8. For example, the summing circuit S1 associated with position F1 receives an input from channel 9 on line I9 and an input from the output of position F3 on line F3. A complete set of connections is defined by table I showing 36 of the 127 autonomous states derived from the equation of the chosen cyclic code.

As explained in detail in the cross-referenced patent application, the connections between the 18 input bus channels and the eight summing circuits are defined by the first 18 rows of the table and the feedback connections via the feedback bus 4 are defined by the next eight rows of the table. For example, channel No. 1 is connected to summing circuit S1 (as shown by code I1) and the output of feedback shift register position F1 is connected to the inputs of the feedback shift register positions F3, F3 and F7 through summing circuits S3, S5 and S7. Counting the number of "ones" in the table for the first 26 rows, gives a total of 76 input connections to the summing circuits S1 through S8.

Figure 3:
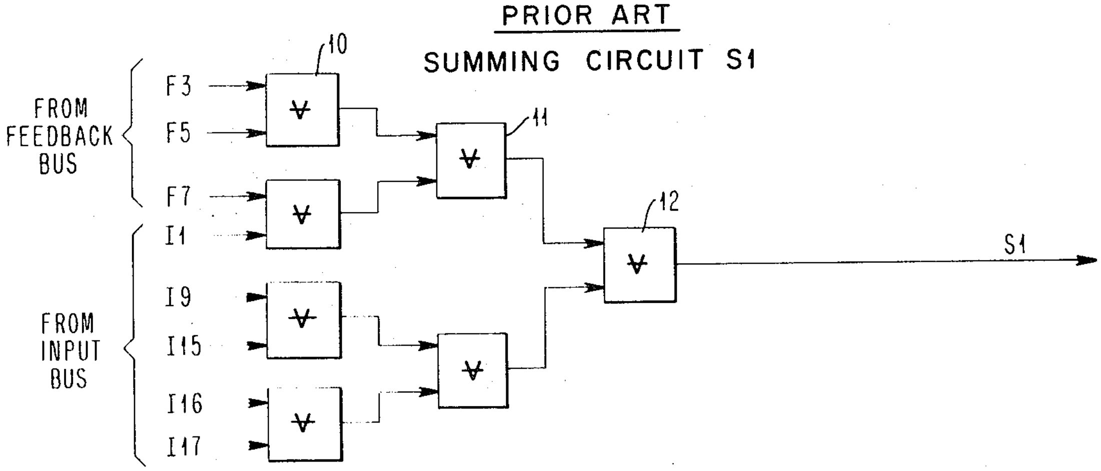
FIG. 3 PRIOR ART
FIG. 3 is a logic diagram showing an illustrative summing circuit in the prior art feedback shift register.

Referring now to FIG. 3, the detailed logic of the prior art summing circuit S1 is shown to illustrate the structural effect of each input connection. Summing circuit S1 comprises seven EXCLUSIVE-OR circuits. The other summing circuits S2 through S8 are similarly effected. EXCLUSIVE-OR circuit 10 receives outputs from feedback shift register positions F3 and F5 via the feedback bus 4. This illustrates that: each pair of inputs to a summing circuit requires an EXCLUSIVE-OR circuit; that each pair of such EXCLUSIVE-OR circuits requires an additional second level EXCLUSIVE-OR circuit (for example, EXCLUSIVE-OR circuit 11); that each pair of such second level EXCLUSIVE-OR circuits requires an additional third level EXCLUSIVE-OR circuit (for example, EX-

TABLE I

[Prior art]

| | | Summing circuit inputs | | | | | | | | Channel/feedback sources |
|---|---|---|---|---|---|---|---|---|---|---|
| | | S1 | S2 | S3 | S4 | S5 | S6 | S7 | S8 | |
| Channel connections | Row 1 | 1 | 0 | 0 | 0 | 0 | 0 | 0 | 0 | Channel #1. |
| | Row 2 | 0 | 1 | 0 | 0 | 0 | 0 | 0 | 0 | Channel #2. |
| | Row 3 | 0 | 0 | 1 | 0 | 0 | 0 | 0 | 0 | Channel #3. |
| | Row 4 | 0 | 0 | 0 | 1 | 0 | 0 | 0 | 0 | Channel #4. |
| | Row 5 | 0 | 0 | 0 | 0 | 1 | 0 | 0 | 0 | Channel #5. |
| | Row 6 | 0 | 0 | 0 | 0 | 0 | 1 | 0 | 0 | Channel #6. |
| | Row 7 | 0 | 0 | 0 | 0 | 0 | 0 | 1 | 0 | Channel #7. |
| | Row 8 | 0 | 0 | 0 | 0 | 0 | 0 | 0 | 1 | Channel #8. |
| | Row 9 | 1 | 1 | 1 | 0 | 0 | 0 | 0 | 0 | Channel #9. |
| | Row 10 | 0 | 1 | 1 | 1 | 0 | 0 | 0 | 0 | Channel #10. |
| | Row 11 | 0 | 0 | 1 | 1 | 1 | 0 | 0 | 0 | Channel #11. |
| | Row 12 | 0 | 0 | 0 | 1 | 1 | 1 | 0 | 0 | Channel #12. |
| | Row 13 | 0 | 0 | 0 | 0 | 1 | 1 | 1 | 0 | Channel #13. |
| | Row 14 | 0 | 0 | 0 | 0 | 0 | 1 | 1 | 1 | Channel #14. |
| | Row 15 | 1 | 1 | 1 | 0 | 0 | 0 | 1 | 1 | Channel #15. |
| | Row 16 | 1 | 0 | 0 | 1 | 0 | 0 | 0 | 1 | Channel #16. |
| | Row 17 | 1 | 0 | 1 | 0 | 1 | 0 | 0 | 0 | Channel #17. |
| | Row 18 | 0 | 1 | 0 | 1 | 0 | 1 | 0 | 0 | Channel #18. |
| Feedback connections | Row 19 | 0 | 0 | 1 | 0 | 1 | 0 | 1 | 0 | Feedback F1. |
| | Row 20 | 0 | 0 | 0 | 1 | 0 | 1 | 0 | 1 | Feedback F2. |
| | Row 21 | 1 | 1 | 1 | 0 | 1 | 0 | 1 | 0 | Feedback F3. |
| | Row 22 | 0 | 1 | 1 | 1 | 0 | 1 | 0 | 1 | Feedback F4. |
| | Row 23 | 1 | 1 | 0 | 1 | 1 | 0 | 1 | 0 | Feedback F5. |
| | Row 24 | 0 | 1 | 1 | 0 | 1 | 1 | 0 | 1 | Feedback F6. |
| | Row 25 | 1 | 1 | 0 | 1 | 0 | 1 | 1 | 0 | Feedback F7. |
| | Row 26 | 0 | 1 | 1 | 0 | 1 | 0 | 1 | 1 | Feedback F8. |
| | Row 27 | 1 | 1 | 0 | 1 | 0 | 1 | 0 | 1 | |
| | Row 28 | 1 | 0 | 0 | 0 | 1 | 0 | 1 | 0 | |
| | Row 29 | 0 | 1 | 0 | 0 | 0 | 1 | 0 | 1 | |
| | Row 30 | 1 | 1 | 0 | 0 | 0 | 0 | 1 | 0 | |
| | Row 31 | 0 | 1 | 1 | 0 | 0 | 0 | 0 | 1 | |
| | Row 32 | 1 | 1 | 0 | 1 | 0 | 0 | 0 | 0 | |
| | Row 33 | 0 | 1 | 1 | 0 | 1 | 0 | 0 | 0 | |
| | Row 34 | 0 | 0 | 1 | 1 | 0 | 1 | 0 | 0 | |
| | Row 35 | 0 | 0 | 0 | 1 | 1 | 0 | 1 | 0 | |
| | Row 36 | 0 | 0 | 0 | 0 | 1 | 1 | 0 | 1 | |

TABLE II

| | | Summing circuit inputs | | | | | | | | Channel/feedback sources | |
|---|---|---|---|---|---|---|---|---|---|---|---|
| | | S1 | S2 | S3 | S4 | S5 | S6 | S7 | S8 | Conceptual | Real |
| Channel connections | Row 1 | 1 | 0 | 0 | 0 | 0 | 0 | 0 | 0 | Channel #1 | Channel #1. |
| | Row 2 | 0 | 1 | 0 | 0 | 0 | 0 | 0 | 0 | Channel #2 | Channel #2. |
| | Row 3 | 0 | 0 | 1 | 0 | 0 | 0 | 0 | 0 | Channel #3 | Channel #3. |
| | Row 4 | 0 | 0 | 0 | 1 | 0 | 0 | 0 | 0 | Channel #4 | Channel #4. |
| | Row 5 | 0 | 0 | 0 | 0 | 1 | 0 | 0 | 0 | Channel #5 | Channel #5. |
| | Row 6 | 0 | 0 | 0 | 0 | 0 | 1 | 0 | 0 | Channel #6 | Channel #6. |
| | Row 7 | 0 | 0 | 0 | 0 | 0 | 0 | 1 | 0 | Channel #7 | Channel #7. |
| | Row 8 | 0 | 0 | 0 | 0 | 0 | 0 | 0 | 1 | Channel #8 | Channel #8. |
| | Row 9 | 1 | 1 | 1 | 0 | 0 | 0 | 0 | 0 | Channel #9 | Channel #9. |
| | Row 10 | 0 | 1 | 1 | 1 | 0 | 0 | 0 | 0 | Channel #10 | Channel #10. |
| | Row 11 | 0 | 0 | 1 | 1 | 1 | 0 | 0 | 0 | Channel #11 | Channel #11. |
| | Row 12 | 0 | 0 | 0 | 1 | 1 | 1 | 0 | 0 | Channel #12 | Channel #12. |
| | Row 13 | 0 | 0 | 0 | 0 | 1 | 1 | 1 | 0 | Channel #13 | Channel #13. |
| | Row 14 | 0 | 0 | 0 | 0 | 0 | 1 | 1 | 1 | Channel #14 | Channel #14. |
| | Row 15 | ~~1~~ | ~~1~~ | ~~1~~ | ~~0~~ | ~~0~~ | ~~0~~ | ~~1~~ | ~~1~~ | Channel #15 | Phantom. |
| | Row 16 | 1 | 0 | 0 | 1 | 0 | 0 | 0 | 1 | Channel #16 | Channel #15. |
| | Row 17 | 1 | 0 | 1 | 0 | 1 | 0 | 0 | 0 | Channel #17 | Channel #16. |
| | Row 18 | 0 | 1 | 0 | 1 | 0 | 1 | 0 | 0 | Channel #18 | Channel #17. |
| | Row 19 | 0 | 0 | 1 | 0 | 1 | 0 | 1 | 0 | Channel #19 | Channel #18. |
| Feedback connections | Row 20 | 0 | 0 | 0 | 1 | 0 | 1 | 0 | 1 | Feedback F1 | |
| | Row 21 | 1 | 1 | 1 | 0 | 1 | 0 | 1 | 0 | Feedback F2 | |
| | Row 22 | 0 | 1 | 1 | 1 | 0 | 1 | 0 | 1 | Feedback F3 | |
| | Row 23 | 1 | 1 | 0 | 1 | 1 | 0 | 1 | 0 | Feedback F4 | |
| | Row 24 | 0 | 1 | 1 | 0 | 1 | 1 | 0 | 1 | Feedback F5 | |
| | Row 25 | 1 | 1 | 0 | 1 | 0 | 1 | 1 | 0 | Feedback F6 | |
| | Row 26 | 0 | 1 | 1 | 0 | 1 | 0 | 1 | 1 | Feedback F7 | |
| | Row 27 | 1 | 1 | 0 | 1 | 0 | 1 | 0 | 1 | Feedback F8 | |
| | Row 28 | 1 | 0 | 0 | 0 | 1 | 0 | 1 | 0 | | |
| | Row 29 | 0 | 1 | 0 | 0 | 0 | 1 | 0 | 1 | | |
| | Row 30 | 1 | 1 | 0 | 0 | 0 | 0 | 1 | 0 | | |
| | Row 31 | 0 | 1 | 1 | 0 | 0 | 0 | 0 | 1 | | |
| | Row 32 | 1 | 1 | 0 | 1 | 0 | 0 | 0 | 0 | | |
| | Row 33 | 0 | 1 | 1 | 0 | 1 | 0 | 0 | 0 | | |
| | Row 34 | 0 | 0 | 1 | 1 | 0 | 1 | 0 | 0 | | |
| | Row 35 | 0 | 0 | 0 | 1 | 1 | 0 | 1 | 0 | | |
| | Row 36 | 0 | 0 | 0 | 0 | 1 | 1 | 0 | 1 | | |

CLUSIVE-OR circuit 12); etc. Eliminating two inputs eliminates not only the associated EXCLUSIVE-OR circuit but also one second level EXCLUSIVE-OR circuit. For example, were inputs connections F3 and F5 eliminated, both circuits 10 and 11 would also be eliminated.

Referring again to table I, the total number of "ones" in the first 26 rows determines the number of connections and, therefore, EXCLUSIVE-OR circuits required. While the first eight rows require only one connection each, a rapid increase in the number of connections required occurs thereafter. Inspection of table I shows that row 15 requires an unusually large number of connections and that there might result in a significant hardware saving were it eliminated. Table II shows the elimination of row 15. The channels are renumbered as though there were 19 (conceptual) channels and the code words were 76 (4×19)-bits long as shown in the "conceptual" column of table II. Since no connections need be made to the channel corresponding to an eliminated row, such a channel is called a phantom and actual connections are made only for each real channel as shown in the "real" column of table II.

It will be seen that the feedback connections are now defined by rows 20 through 27. Inspection of the feedback rows 20 through 27 shows that they require many more connections than are required by the next group of eight rows, rows 28 through 35. Thus if they are eliminated and the eight contiguous rows 28 through 35 used to define the feedback connections even greater simplification would be achieved.

Table III shows the elimination of rows 20–27 and the renumbering of the channels as though there were 27 (conceptual) channels for the expanded 108 (4×27)-bit code

TABLE III

| | | Summing circuit inputs | | | | | | | | Channel/feedback sources | |
|---|---|---|---|---|---|---|---|---|---|---|---|
| | | S1 | S2 | S3 | S4 | S5 | S6 | S7 | S8 | Conceptual | Real |
| Channel connections | Row 1 | 1 | 0 | 0 | 0 | 0 | 0 | 0 | 0 | Channel #1 | Channel #1. |
| | Row 2 | 0 | 1 | 0 | 0 | 0 | 0 | 0 | 0 | Channel #2 | Channel #2. |
| | Row 3 | 0 | 0 | 1 | 0 | 0 | 0 | 0 | 0 | Channel #3 | Channel #3. |
| | Row 4 | 0 | 0 | 0 | 1 | 0 | 0 | 0 | 0 | Channel #4 | Chalnne #4. |
| | Row 5 | 0 | 0 | 0 | 0 | 1 | 0 | 0 | 0 | Channel #5 | Channel #5. |
| | Row 6 | 0 | 0 | 0 | 0 | 0 | 1 | 0 | 0 | Channel #6 | Channel #6. |
| | Row 7 | 0 | 0 | 0 | 0 | 0 | 0 | 1 | 0 | Channel #7 | Channel #7. |
| | Row 8 | 0 | 0 | 0 | 0 | 0 | 0 | 0 | 1 | Channel #8 | Channel #8. |
| | Row 9 | 1 | 1 | 1 | 0 | 0 | 0 | 0 | 0 | Channel #9 | Channel #9. |
| | Row 10 | 0 | 1 | 1 | 1 | 0 | 0 | 0 | 0 | Channel #10 | Channel #10. |
| | Row 11 | 0 | 0 | 1 | 1 | 1 | 0 | 0 | 0 | Channel #11 | Channel #11. |
| | Row 12 | 0 | 0 | 0 | 1 | 1 | 1 | 0 | 0 | Channel #12 | Channel #12. |
| | Row 13 | 0 | 0 | 0 | 0 | 1 | 1 | 1 | 0 | Channel #13 | Channel #13. |
| | Row 14 | 0 | 0 | 0 | 0 | 0 | 1 | 1 | 1 | Channel #14 | Channel #14. |
| | Row 15 | ~~1~~ | ~~1~~ | ~~1~~ | ~~0~~ | ~~0~~ | ~~0~~ | ~~1~~ | ~~1~~ | Channel #15 | Phantom. |
| | Row 16 | 1 | 0 | 0 | 1 | 0 | 0 | 0 | 1 | Channel #16 | Channel #15. |
| | Row 17 | 1 | 0 | 1 | 0 | 1 | 0 | 0 | 0 | Channel #17 | Channel #16. |
| | Row 18 | 0 | 1 | 0 | 1 | 0 | 1 | 0 | 0 | Channel #18 | Channel #17. |
| | Row 19 | 0 | 0 | 1 | 0 | 1 | 0 | 1 | 0 | Channel #19 | Channel #18. |
| | Row 20 | ~~0~~ | ~~0~~ | ~~0~~ | ~~1~~ | ~~0~~ | ~~1~~ | ~~0~~ | ~~1~~ | Channel #20 | Phantom. |
| | Row 21 | ~~1~~ | ~~1~~ | ~~1~~ | ~~0~~ | ~~1~~ | ~~0~~ | ~~1~~ | ~~0~~ | Channel #21 | Phantom. |
| | Row 22 | ~~0~~ | ~~1~~ | ~~1~~ | ~~1~~ | ~~0~~ | ~~1~~ | ~~0~~ | ~~1~~ | Channel #22 | Phantom. |
| | Row 23 | ~~1~~ | ~~1~~ | ~~0~~ | ~~1~~ | ~~1~~ | ~~0~~ | ~~1~~ | ~~0~~ | Channel #23 | Phantom. |
| | Row 24 | ~~0~~ | ~~1~~ | ~~1~~ | ~~0~~ | ~~1~~ | ~~1~~ | ~~0~~ | ~~1~~ | Channel #24 | Phantom. |
| | Row 25 | ~~1~~ | ~~1~~ | ~~0~~ | ~~1~~ | ~~0~~ | ~~1~~ | ~~1~~ | ~~0~~ | Channel #25 | Phantom. |
| | Row 26 | ~~0~~ | ~~1~~ | ~~1~~ | ~~0~~ | ~~1~~ | ~~0~~ | ~~1~~ | ~~1~~ | Channel #26 | Phantom. |
| | Row 27 | ~~1~~ | ~~1~~ | ~~0~~ | ~~1~~ | ~~0~~ | ~~1~~ | ~~0~~ | ~~1~~ | Channel #27 | Phantom. |
| Feedback connections | Row 28 | 1 | 0 | 0 | 0 | 1 | 0 | 1 | 0 | Feedback F1 | |
| | Row 29 | 0 | 1 | 0 | 0 | 0 | 1 | 0 | 1 | Feedback F2 | |
| | Row 30 | 1 | 1 | 0 | 0 | 0 | 0 | 1 | 0 | Feedback F3 | |
| | Row 31 | 0 | 1 | 1 | 0 | 0 | 0 | 0 | 1 | Feedback F4 | |
| | Row 32 | 1 | 1 | 0 | 1 | 0 | 0 | 0 | 0 | Feedback F5 | |
| | Row 33 | 0 | 1 | 1 | 0 | 1 | 0 | 0 | 0 | Feedback F6 | |
| | Row 34 | 0 | 0 | 1 | 1 | 0 | 1 | 0 | 0 | Feedback F7 | |
| | Row 35 | 0 | 0 | 0 | 1 | 1 | 0 | 1 | 0 | Feedback F8 | |
| | Row 36 | 0 | 0 | 0 | 0 | 1 | 1 | 0 | 1 | | |

words. The next eight rows 28–35 define the feedback connections. Since nine of the rows 15 and 20–27 are unused, they are called phantoms and actual connections are made only to the 18 real channels in accordance with the matrix rows specified in the last column of table III.

While the examples of tables II and III are chosen to illustrate hardware savings that may be obtained, the choice is for purpose of illustration only and somewhat simplified. For an SEC/DED code, it is known that the state vectors pertaining to the initial state (10000000) are all of odd weights (i.e., containing an odd number of 1's). The real channel submatrix of table III includes all possible weight-1 vectors; and all of its remaining vectors are of weight-3, the smallest possible next higher weight. Therefore, the scheme is optimum since a minimum number of input connections is obtained for the specified multiplicity of channels.

Figure 4:
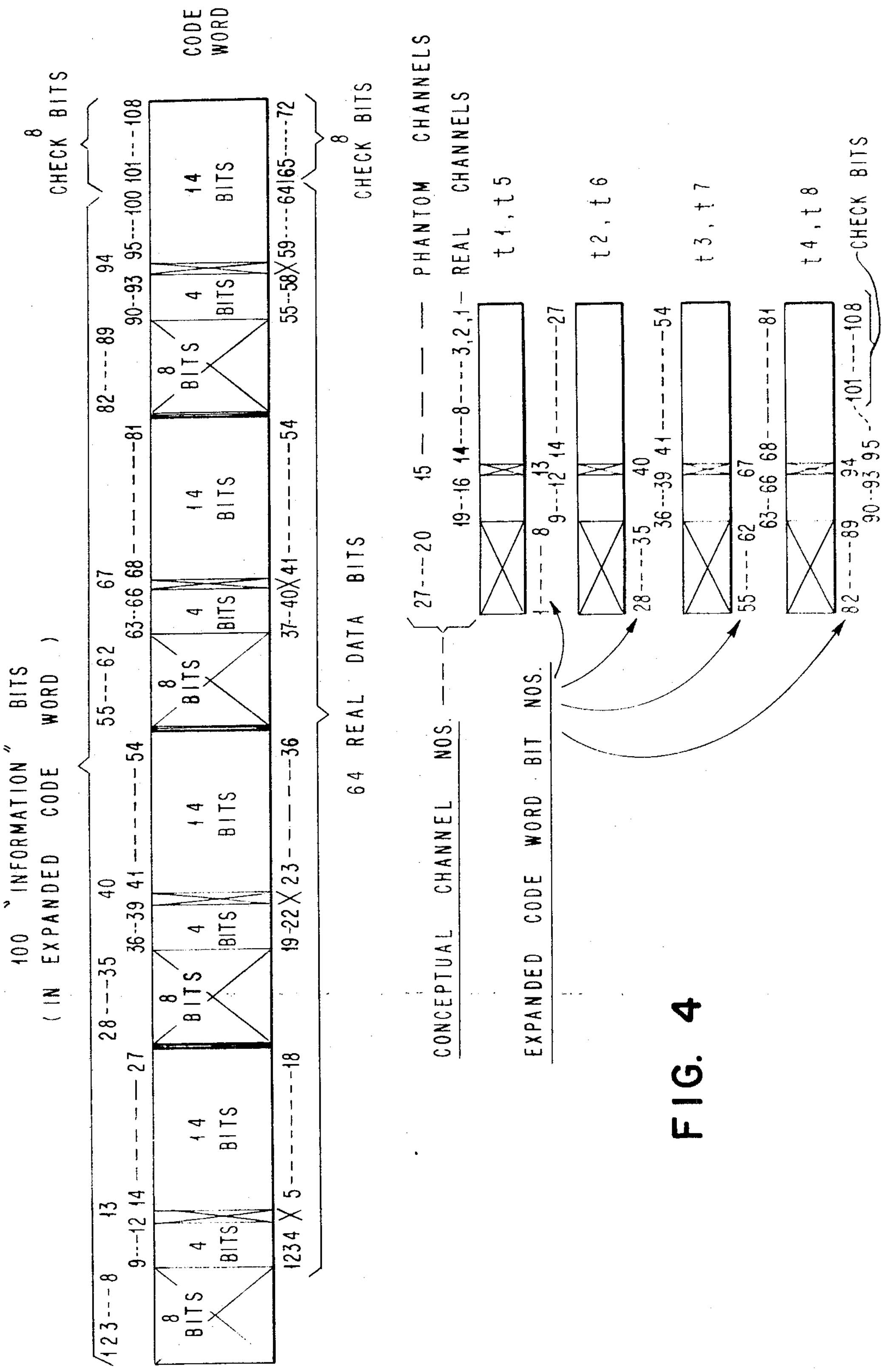
FIG. 4 is a diagram showing the format of a code word used in the preferred embodiment disclosed herein.

The implications of the choices made in table III will be shown with reference to FIG. 4. A real code word transmitted over 18-bit channels is expanded as shown in FIG. 4 in accordance with the matrix of table III. The phantom portions of the expanded code word corresponding to rows 15 and 20–27 of the matrix are indicated by crosses in the work format. The expanded code word conceptually includes 108 data bits of which 100 are information bits and eight are check bits. The code word is divided into four equal sections of 27 bits which correspond, in reverse order, to the 27 rows used for the channel to shift register position input connections in table III. The 15th row of the matrix is represented by bit positions 13, 40, 67 and 94 in the code word and matrix rows 20–27 are represented by bit positions 1–8, 28–35, 55–62 and 82–89. Eighteen real channels are utilized but, for all analytical purposes, the circuits are designated as though there were 27 channels carrying data from a code word 108 bits wide.

Referring now to FIGS. *5a* through *5d*, the design of a feedback shift register utilizing the combined real and phantom channel input is shown. The real inputs from the 18 real channels are shown by solid lines and the nine phantom inputs from the nine phantom channels are shown by dashed lines. For example: an input from real channel No. 1 enters the summing circuit S1 via a line labeled I1 and phantom channel No. 15 enters summing circuits S1, S2, S3, S7 and S8 as shown. Real channel No. 15 (which corresponds to row 16 of the matrix) enters summing circuits S1, S4 and S8 via line I16. All the input lines for rows 20–27 of the matrix are phantoms indicated by the inputs I20–I27. The interconnections among the feedback shift register positions F1–F8 are defined by matrix rows 28–35. For example, row 28 indicates that the output of register position F1 enters the summing circuits S1, S5 and S7 via line labeled F1.

Actual connections, provided only for those solid lines indicating real channels, total 38 inputs from the real input bus and 24 inputs from the feedback bus, for a sum of 62 inputs. As noted above, the prior art requires 76 inputs total. The effect of this on the amount of circuitry required will be shown with reference to FIG. 6.

Figures 5A, 5B:
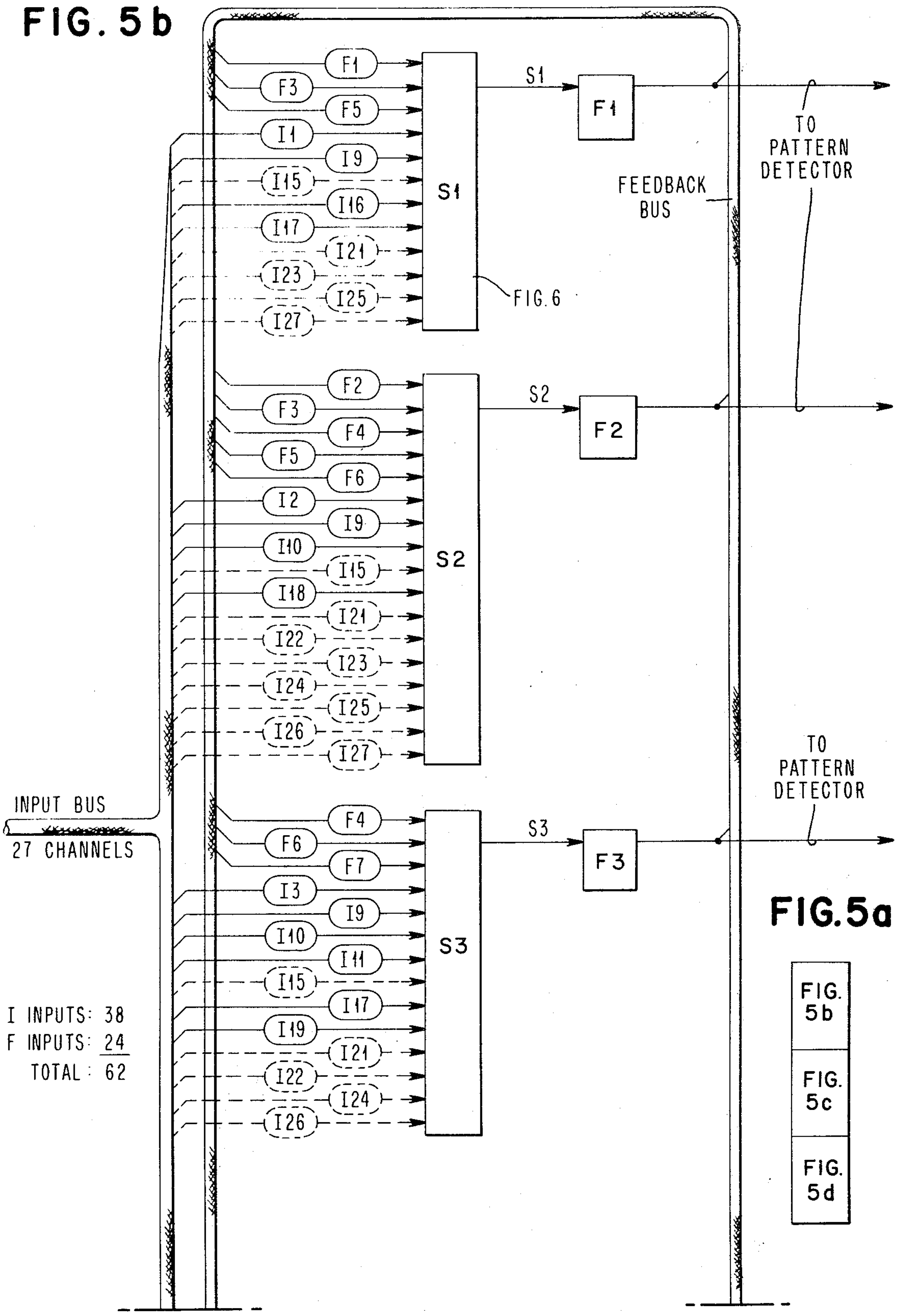
FIGS. 5*b* through 5*d*, when connected as shown in FIG. 5*a*, form a logic diagram showing the feedback shift register of the preferred embodiment disclosed herein.
Figure 5C:
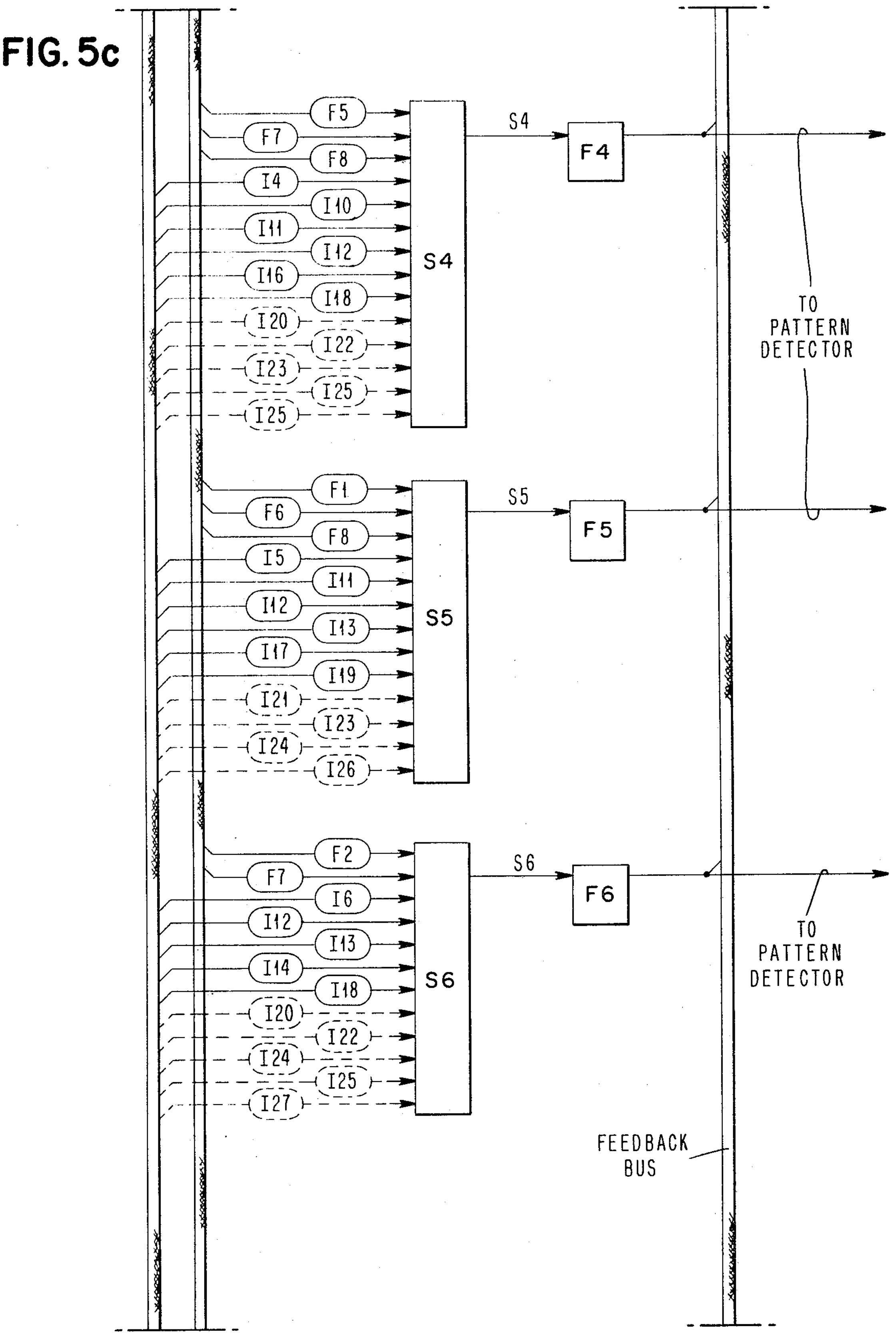
Figure 5D:
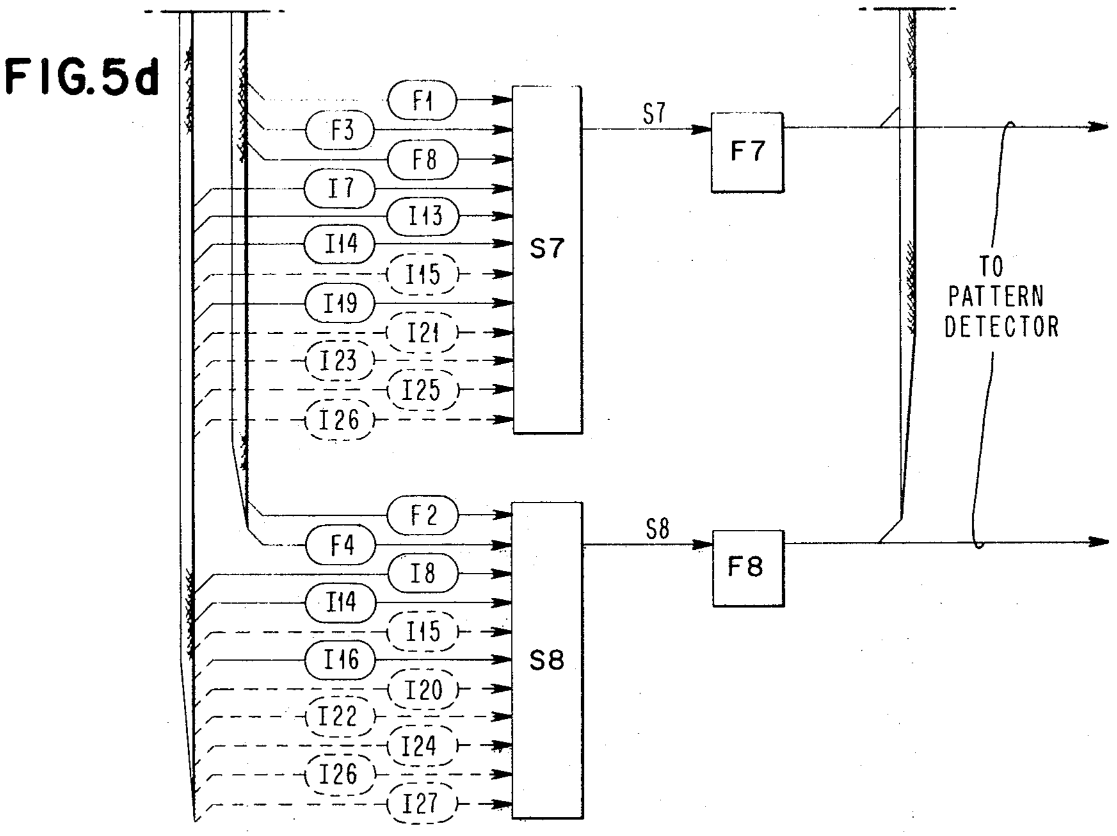
Figure 6:
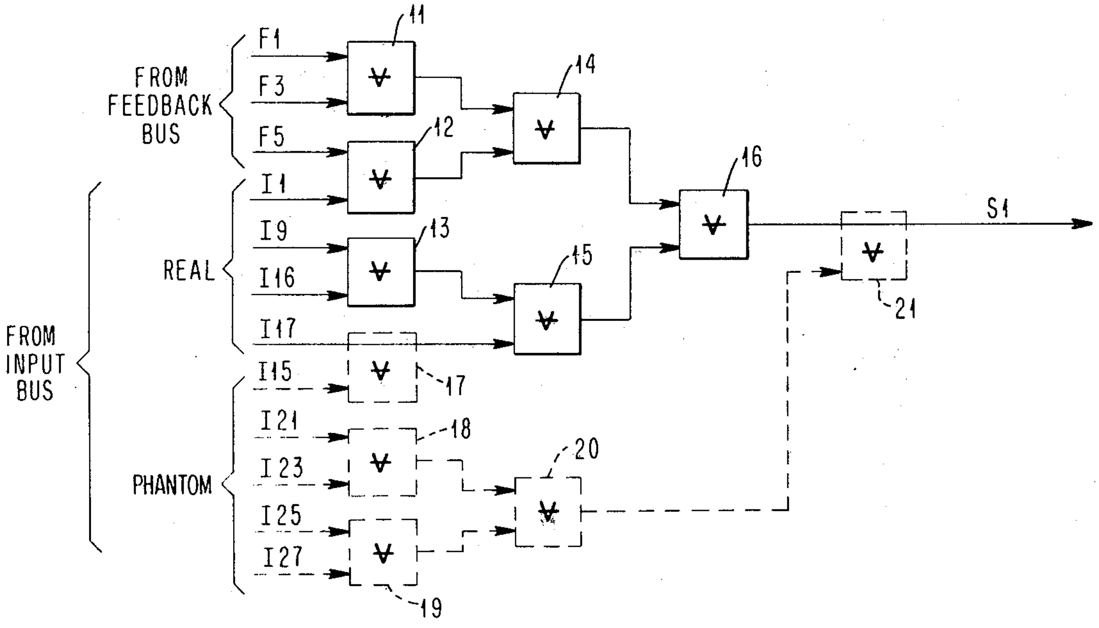
FIG. 6 is a logic diagram showing an illustrative summing circuit of the preferred embodiment feedback shift register.

In FIG. 6, the construction of an illustrative summing circuit S1 is shown in more detail. There are provided six EXCLUSIVE-OR circuits 11, 12, 13, 14, 15 and 16 and there are indicated, by dashed lines, five additional EXCLUSIVE-OR circuits 17, 18, 19, 20 and 21. The real inputs, shown in FIGS. 5 and 6 by solid lines, enter the real EXCLUSIVE-OR circuits 11–16 and the phantom lines from phantom channels, shown as dashed lines, enter the dashed EXCLUSIVE-OR circuits 17–21. Were all the connections, shown in table III, required there would be 12 inputs and 11 EXCLUSIVE-OR circuits. However, the expansion of the code word represented by table III eliminates those rows having the most one bits therein by assigning them to phantom channels not requiring any connections to the summing circuits. Therefore in summing circuit S1, it is not necessary to provide EXCLUSIVE-OR circuits 17–21 resulting in a circuit which contains only six EXCLUSIVE-OR circuits 11–16. It will be noticed, by reference to FIG. 3, that this S1 circuit is simpler than the corresponding circuit of the prior art and that the extension of this design to the balance of the summing circuits S2–S8, will result in the elimination of 14 inputs and a hardware savings of more than 20 percent.

While the specific embodiment has been shown, the choice of phantom channels is not limited by this example but only by criteria dictated by the nature of cyclic codes and the specified number of real channels desired. First, it is necessary that the input connections from the channels to the register positions be chosen from among the first rows taken from the matrix. However, the choice of phantom channels may result in the selection of any rows of the complete matrix of autonomous states. It is not necessary that the choice of rows be contiguous: that is, it is permissable to scatter phantom channels throughout the group of rows defining the input connections as long as the feedback connections are chosen from the contiguous rows which immediately follow the last matrix row defining the last input connections or phantoms.

Comparison of table III with FIG. 4 shows that the check bit positions, in the fourth section (times $t_4$ and $t_8$) of the data word, are assigned to channel positions 1–8. Since channel positions 1–8 correspond to rows 1–8 of the matrix (which are the eight simplest rows found in the entire matrix,) it will always be desirable to retain rows 1–8 and hence it will never be necessary to expand the check bit portion at the very end of the expanded code word.

In designing a feedback shift register using the techniques described herein, it is also desirable to choose rows of the matrix which permit a distribution of inputs to the feedback shift registers which utilize equal, or nearly uniform, levels of summing circuit EXCLUSIVE-OR's as shown in FIG. 6. While it may appear advantageous to choose the rows in such a way as to have the least total number of EXCLUSIVE-OR's, care must be given against any unfavorable distribution of inputs among the summing circuits. Some advantage would be lost if one or two summing circuits have substantially longer delays than the rest.

As additional restriction is determined by the length of the code word. Designating as P1 the number of all matrix rows which correspond to the phantom channels embedded in the groups of real channels, (for example, row 15) and designating as P2 the number of those rows which correspond to those phantom channels appended to the last real channel (for example, rows 20–27), the total number of phantom channels is $\pi=P1+P2$. If the original code word is of length $n$, and the number of real channels is $c$, then the new expanded number of channels is $c+\pi$, and the total length of the expanded code word is $(c+\pi/c)\ n$. For a shortened code, $n$ is less than a certain number N, the maximum allowable full code length for a given code. (For example, in the illustrated SEC/DED code with eight check bits, the full code length N is 127.) The $\pi$ in the above expression for the length of the expanded code word must be such that $(c+\pi/c) \leqq N$.

It follows from the principles underlying phantom channels and expanded code words that the design of the pattern detector 5 for error location and correction purposes is also based on the expanded number of channels and the expanded code word length according to the teaching of the referenced Lee patent application. Since the phantom channels, being physically nonexistent, cannot introduce errors; there is not need to attempt to locate or correct errors in these conceptual channels. Hence certain pattern detecting and error correcting circuits may be eliminated, although conceptually they do have appropriate places in the system structure. For the example code, the pattern detector design and its usage are given in table IV. The principles involved are apparent when this table is compared with table I of the cross-referenced application.

While the invention has been shown and described with reference to a preferred embodiment thereof, it will be understood by those skilled in the art that the foregoing and other changes in form and details may be made therein without departing from the spirit and scope of the invention.

TABLE IV

| Matrix row identity in the list of autonomous states | Error syndrome pattern | | | | | | | | Conceptual | Bit in the expanded code word for which error correction will be made when specific impage pattern is recognized following shift at time— | | | |
|---|---|---|---|---|---|---|---|---|---|---|---|---|---|
| | F1 | F2 | F3 | F4 | F5 | F6 | F7 | F8 | | $t_4$ | $t_5$ | $t_6$ | $t_7$ |
| Row 82 | 0 | 0 | 0 | 0 | 1 | 0 | 1 | 1 | Channel #1 | 27 | 54 | 81 | 108 |
| Row 83 | 1 | 1 | 1 | 0 | 0 | 1 | 0 | 1 | Channel #2 | 26 | 53 | 80 | 107 |
| Row 84 | 1 | 0 | 0 | 1 | 0 | 0 | 1 | 0 | Channel #3 | 25 | 52 | 79 | 106 |
| Row 85 | 0 | 1 | 0 | 0 | 1 | 0 | 0 | 1 | Channel #4 | 24 | 51 | 78 | 105 |
| Row 86 | 1 | 1 | 0 | 0 | 0 | 1 | 0 | 0 | Channel #5 | 23 | 50 | 77 | 104 |
| Row 87 | 0 | 1 | 1 | 0 | 0 | 0 | 1 | 0 | Channel #6 | 22 | 49 | 76 | 103 |
| Row 88 | 0 | 0 | 1 | 1 | 0 | 0 | 0 | 1 | Channel #7 | 21 | 48 | 75 | 102 |
| Row 89 | 1 | 1 | 1 | 1 | 1 | 0 | 0 | 0 | Channel #8 | 20 | 47 | 74 | 101 |
| Row 90 | 0 | 1 | 1 | 1 | 1 | 1 | 0 | 0 | Channel #9 | 19 | 46 | 73 | 100 |
| Row 91 | 0 | 0 | 1 | 1 | 1 | 1 | 1 | 0 | Channel #10 | 18 | 45 | 72 | 99 |
| Row 92 | 0 | 0 | 0 | 1 | 1 | 1 | 1 | 1 | Channel #11 | 17 | 44 | 71 | 98 |
| Row 93 | 1 | 1 | 1 | 0 | 1 | 1 | 1 | 1 | Channel #12 | 16 | 43 | 70 | 97 |
| Row 94 | 1 | 0 | 0 | 1 | 0 | 1 | 1 | 1 | Channel #13 | 15 | 42 | 69 | 96 |
| Row 95 | 1 | 0 | 1 | 0 | 1 | 0 | 1 | 1 | Channel #14 | 14 | 41 | 68 | 95 |
| Row 96 | ~~1~~ | ~~0~~ | ~~1~~ | ~~1~~ | ~~0~~ | ~~1~~ | ~~0~~ | ~~1~~ | Channel #15* | ~~13~~ | ~~40~~ | ~~67~~ | ~~94~~ |
| Row 97 | 1 | 0 | 1 | 1 | 1 | 0 | 1 | 0 | Channel #16 | 12 | 39 | 66 | 93 |
| Row 98 | 0 | 1 | 0 | 1 | 1 | 1 | 0 | 1 | Channel #17 | 11 | 38 | 65 | 92 |
| Row 99 | 1 | 1 | 0 | 0 | 1 | 1 | 1 | 0 | Channel #18 | 10 | 37 | 64 | 91 |
| Row 100 | 0 | 1 | 1 | 0 | 0 | 1 | 1 | 1 | Channel #19 | 9 | 36 | 63 | 90 |
| Row 101 | ~~1~~ | ~~1~~ | ~~0~~ | ~~1~~ | ~~0~~ | ~~0~~ | ~~1~~ | ~~1~~ | Channel #20* | ~~8~~ | ~~35~~ | ~~62~~ | ~~89~~ |
| Row 102 | ~~1~~ | ~~0~~ | ~~0~~ | ~~0~~ | ~~1~~ | ~~0~~ | ~~0~~ | ~~1~~ | Channel #21* | ~~7~~ | ~~34~~ | ~~61~~ | ~~88~~ |
| Row 103 | ~~1~~ | ~~0~~ | ~~1~~ | ~~0~~ | ~~0~~ | ~~1~~ | ~~0~~ | ~~0~~ | Channel #22* | ~~6~~ | ~~33~~ | ~~60~~ | ~~87~~ |
| Row 104 | ~~0~~ | ~~1~~ | ~~0~~ | ~~1~~ | ~~0~~ | ~~0~~ | ~~1~~ | ~~0~~ | Channel #23* | ~~5~~ | ~~32~~ | ~~59~~ | ~~86~~ |
| Row 105 | ~~0~~ | ~~0~~ | ~~1~~ | ~~0~~ | ~~1~~ | ~~0~~ | ~~0~~ | ~~1~~ | Channel #24* | ~~4~~ | ~~31~~ | ~~58~~ | ~~85~~ |
| Row 106 | ~~1~~ | ~~1~~ | ~~1~~ | ~~1~~ | ~~0~~ | ~~1~~ | ~~0~~ | ~~0~~ | Channel #25* | ~~3~~ | ~~30~~ | ~~57~~ | ~~84~~ |
| Row 107 | ~~0~~ | ~~1~~ | ~~1~~ | ~~1~~ | ~~1~~ | ~~0~~ | ~~1~~ | ~~0~~ | Channel #26* | ~~2~~ | ~~29~~ | ~~56~~ | ~~83~~ |
| Row 108 | ~~0~~ | ~~0~~ | ~~1~~ | ~~1~~ | ~~1~~ | ~~1~~ | ~~0~~ | ~~1~~ | Channel #27* | ~~1~~ | ~~28~~ | ~~55~~ | ~~82~~ |

*Phantom Channels.

What is claimed is:

1. Apparatus to be used in generating at a transmitter checking portions for, and detecting and correcting at a receiver errors in, *n*-bit code words each comprising a *k*-bit data portion and an *n–k* bit checking portion in accordance with a preselected cyclic code, the code words being manifested in *n/c* sequential groups of *c* bits each on *c*-signal lines; there being provided:
   - a register comprising *n–k* positions, each having an input and an output, for assuming successive states, in accordance with the preselected cyclic code, ultimately representative of the checking portion in the case of the transmitter and of the existence and location of a number of errors in the code word data portion in the case of the receiver;
   - *n–k*-summing means each having an output, connected to a different register position input, and inputs for accepting *c* bits of the code word from selected ones of *c+π conceptual channels represented by said c*-signal lines and π phantom lines each channel being associated with selected summing means in accordance with the preselected cyclic code;
   - *n–k* feedback means each having an output, connected to a different register position input, and inputs for accepting selected register position outputs in accordance with the preselected cyclic code; and
   - interconnection means, connecting the real channels (selected ones of the *c*-lines) with the summing means inputs and the register position outputs with the feedback means inputs, in accordance with the preselected cyclic code, defining as phantoms selected ones of those channels requiring the most connections.

2. In combination:
   - a number of sources of parallel input data signals representative of information bits and check bits;
   - a first predetermined number of storage positions, each having an input and an output, sequentially responsive to information bits to ultimately indicate corresponding check bits in accordance with a preselected cyclic code and responsive to information and check bits to ultimately indicate the presence and location of errors in the information bits;
   - entry means connecting a second predetermined number of input data sources in selected groups with individual storage position inputs in accordance with a first connection pattern determined by the preselected cyclic code, said second predetermined number being greater than said first number; and
   - feedback means connecting the outputs of the storage positions in predetermined groups with individual inputs in accordance with a second connection pattern determined by the preselected cyclic code, all connection patterns possible for the preselected cyclic code being representable by a matrix having one column for each storage position and one row for each state in the sequence of states possible for the preselected cyclic code, the first connection pattern being established by a third predetermined number of consecutive rows of said matrix beginning with the first row said third number exceeding said second predetermined number, and the second connection pattern being established by a second contiguous number of rows, following the said third number of rows in the sequence equal, and corresponding, to the number of storage positions.

3. The method of establishing parallel-input parallel-feedback connections for an *n–k* stage shift register to generate *n–k*-checking bits or error pattern syndrome bits useful to detect and correct errors in *n*-bit code words, in accordance with a shortened (*n–k*)-cyclic code having associated therewith an autonomous state matrix having *n–k* columns and N rows (where N is the cycle length of the extended code); comprising the steps of:
   - dividing the *n* information bits into *n/c* sequential portions each having *c* real bits, corresponding to information bits, interleaved with additional π phantom bits;
   - associating selected groups of the sequential *c+π* portions with summing inputs of respective ones of the *n–k* shift register stages in accordance with successive rows of said matrix;
   - associating selected groups of the *n–k* outputs of the shift register with other summing inputs of the individual register stages in accordance with other successive rows of said matrix; and
   - connecting the associated groups to said inputs in accordance with said matrix rows assuming the convention that phantom information bits have constant-zero value and positional correspondence with matrix rows which require the most connections.

4. In apparatus including an *n–k*-stage register for indicating existence and position of error in *n*-bit groups of signals carried in parallel on *c* lines, said signals intended to represent *n*-bit code words of a shortened (*n*,*k*)-cyclic error correcting code (*n–k* less than *c*) the improvement comprising:
   - *n–k*-summing networks having individual outputs connecting with inputs of respective stages of said indicating register, and having individual first and second groups of inputs;
   - means for connecting said first groups of inputs of said summing networks in parallel to respective predetermined groups of feedback outputs of said register;
   - means for connecting said second groups of inputs of said summing networks in parallel to respective predetermined groups of said $c$-lines;

said predetermined groups of said register feedback outputs and said lines being designated in association with a submatrix of $c+n-k$ selected rows of the autonomous generating matrix of said $(n,k)$ code, the submatrix being formed by selecting from among the rows of said matrix only rows containing fewer than a predetermined number of nonzero-digit elements.

5. Apparatus according to claim 4 in which the said selection of submatrix rows is designed to effect economies in the numbers of parallel inputs handled by said summing networks and thereby effect economies in said summing networks.

6. Apparatus according to claim 5 wherein said selection of rows of said matrix establishes a unique shift in the relative positions of said lines and in the associated error position indications manifested by said register when error occurs on one of said lines, whereby in effect plural phantom lines may be considered as positioned between certain of the said $c$-lines; said phantom lines being viewable as carrying phantom signals of constant 0 value.

7. The apparatus of claim 6 wherein particular error syndrome states occurring in said register at particular parallel shift times, are associated with the space and time positions of error in particular signals on particular lines of the aggregate set of said $c$-lines and phantom lines.

* * * * *